(12) United States Patent
McConnell et al.

(10) Patent No.: US 8,266,701 B2
(45) Date of Patent: Sep. 11, 2012

(54) SYSTEMS AND METHODS FOR MEASURING CYBER BASED RISKS IN AN ENTERPRISE ORGANIZATION

(75) Inventors: James T. McConnell, Keller, TX (US); Edward J. Norris, Lancaster, MA (US)

(73) Assignee: Verizon Services Corp., Ashburn, VA (US)

( * ) Notice: Subject to any disclaimer, the term of this patent is extended or adjusted under 35 U.S.C. 154(b) by 1241 days.

(21) Appl. No.: 11/485,112

(22) Filed: Jul. 12, 2006

(65) Prior Publication Data

US 2008/0016563 A1 Jan. 17, 2008

(51) Int. Cl.
*G06F 21/00* (2006.01)
(52) U.S. Cl. ........................................... 726/25
(58) Field of Classification Search ................ 726/25
See application file for complete search history.

(56) References Cited

U.S. PATENT DOCUMENTS

| | | | |
|---|---|---|---|
| 7,000,247 B2 * | 2/2006 | Banzhof | 726/2 |
| 7,278,163 B2 * | 10/2007 | Banzhof et al. | 726/25 |
| 7,593,942 B2 * | 9/2009 | Sack et al. | 1/1 |
| 7,657,942 B2 * | 2/2010 | Himberger et al. | 726/25 |
| 2004/0193907 A1 * | 9/2004 | Patanella | 713/200 |
| 2006/0156408 A1 * | 7/2006 | Himberger et al. | 726/25 |
| 2006/0248084 A1 * | 11/2006 | Sack et al. | 707/9 |
| 2006/0248085 A1 * | 11/2006 | Sack et al. | 707/9 |
| 2007/0050777 A1 * | 3/2007 | Hutchinson et al. | 718/104 |
| 2007/0143851 A1 * | 6/2007 | Nicodemus et al. | 726/25 |

OTHER PUBLICATIONS

Gary Stoneburner, Alice Goguen, and Alexis Feringa; Risk Management Guid for Information Technology Systems; NIST; Jul. 2002.*

* cited by examiner

*Primary Examiner* — Edan Orgad
*Assistant Examiner* — James Turchen

(57) ABSTRACT

A method and system are disclosed for assessing cyber-based risks in an enterprise organization. A database comprising vulnerability data associated with computers in an enterprise is combined with a second database comprising data of users of computers in an enterprise, along with a third database base indicating the relationship of the users in an organization structure in the enterprise. From the synthesis of data in these separate databases, text based reports detailing aggregate computer vulnerabilities can be produced on a computer, as well as organizational charts depicting the relationship between selected individuals and their computer vulnerabilities. Using such reports, individuals charged with cyber-security can assess organizational cyber risks and allocate resources as appropriate.

19 Claims, 5 Drawing Sheets

SYSTEMS AND METHODS FOR MEASURING CYBER BASED RISKS IN AN ENTERPRISE ORGANIZATION

BACKGROUND INFORMATION

The proliferation of networked computers using a network (e.g. Internet) has grown exponentially in recent years. In addition, many local or enterprise networks have connectivity to a network (e.g. Internet) via a gateway, so that all computers on a business' local network are also accessible to a network (e.g. Internet). Other forms of access, including wireless devices, allowing access to a local or enterprise network, as well as directly to a network (e.g. Internet) are common. In short, network connectivity of computers is quite common.

It is also well known that networked computer may be susceptible to on-line cyber attacks. Such cyber attacks are typically attempts to obtain control or information from the target computer system. A common form of information is data stored pertaining to personal and financial data, however "hackers" or intruders will attempt to obtain any information regarding the target computer system, such as passwords, email addresses, program names, etc. in an attempt to further their illegal goals.

Various companies provide hardware and/or software products for monitoring such attacks, which may record and analyze interactions with a target computer. The vulnerabilities can be determined proactively, such as 'probing' computers on a network to determine if they are vulnerable, as well as reactively, such as examining a vulnerability after an intrusion has occurred. One class of products is called vulnerability management systems (VMS) and are well known in the area of computer security. The VMS products can scan or monitor a network and report on vulnerabilities associated with the network. VMS products can provide valuable information in the form of reports regarding the vulnerability of a computer on a network A large business enterprise, which can have tens of thousands of employees working in a country or working in countries across the world, can have thousands of computer systems networked together. Managing the vulnerability of all these computers is a complex task. In some cases, managing the vulnerability of such computers to cyber attacks is done reactively—e.g., only after a computer has been compromised and the compromise detected. Furthermore, the computers can be physically located in various parts of the organization, and for large enterprises, the organization itself can be complex. For many large corporations, there can be numerous subsidiaries and sub-enterprise entities. Indeed, many individuals in a company do not have a complete perspective of the company's organization outside of their immediate workgroup. Consequently, being able to manage computer vulnerabilities for a large enterprise can be very complex and may be carried out on an ad-hoc basis.

Because many large businesses have many networked computers, and because of the frequency of attempts to intrude into their computers, many business have developed computer security organizations whose sole focus is to address such risks and/or cyber attacks. Such personnel require a comprehensive view of the enterprise, both on a human organizational perspective as well as a computer network perspective. In order to address vulnerabilities in the corporate networks, the security people must be able to identify, assess, and react to such threats and vulnerabilities. However, to date, no such tools have been developed to facilitate the management of such problems on a business organization level. Consequently methods and tools for addressing this aspect are required.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION OF THE PREFERRED EMBODIMENTS

Preferred embodiments according to the present inventions now will be described more fully hereinafter with reference to the accompanying drawings, in which some, but not all embodiments of the inventions are shown. The present inventions may be embodied in many different forms and should not be construed as limited to the embodiments set forth herein; rather, these embodiments are provided so that this disclosure will satisfy applicable legal requirements. Like numbers refer to like elements throughout. Although specific terms are employed herein, they are used in a generic and descriptive sense only and not for purposes of limitation.

Computer security is an area which has developed into an industry in its own right. The vast amounts of data stored on computers has lead to a new type of crime perpetrated by individuals known as "hackers" or "cyber-terrorists" and may involve the spreading of "worms" and "viruses" to computers. Also, this may involve the authorized access and copying of information. Various software programs are available for assessing and increasing security to computers. At the simplest level, password protection programs on a computer restrict access by a user to the physical computer. However, for computers that are networked, access to the computer may be possible, not from the keyboard, but using a network (e.g. Internet) connection from a computer across the globe. Further, hackers can obtain password files remotely, and are known to post them to fellow hackers. This is but one way in which access to computers can be compromised.

Those familiar with computer security are familiar with various types of computer programs that will attempt to assess, monitor, and test a computer for vulnerabilities to a cyber attack. These programs attempt to provide protection in various ways and range from simple to complex schemes. One class of products attempt to assess vulnerabilities of computers connected to a network (e.g. Internet). For example, Internet Security Systems' Internet Scanner and System Scanner are products that provide automated vulnerability assessment across servers, desktops, operation systems, routers, firewalls, and hosts. Other manufacturers provide Intrusion Detection Systems (IDS) products that monitor access to computers, detect, and report anomalies in operation or access to a computer via a network (e.g. Internet).

Typically, computers on a network (e.g. Internet) are identified via a network address. This address becomes a convenient method of identifying a system (whether it be a general purpose computer, or special purpose device) for other purposes, such as listing accessible computers in an organization. Thus, the reports generated by various security assessment products typically identify vulnerabilities with respect to a computer, which can be identified via a network address. This type of report is illustrated as a vulnerability report 100 in FIG. 1.

Figure 1:
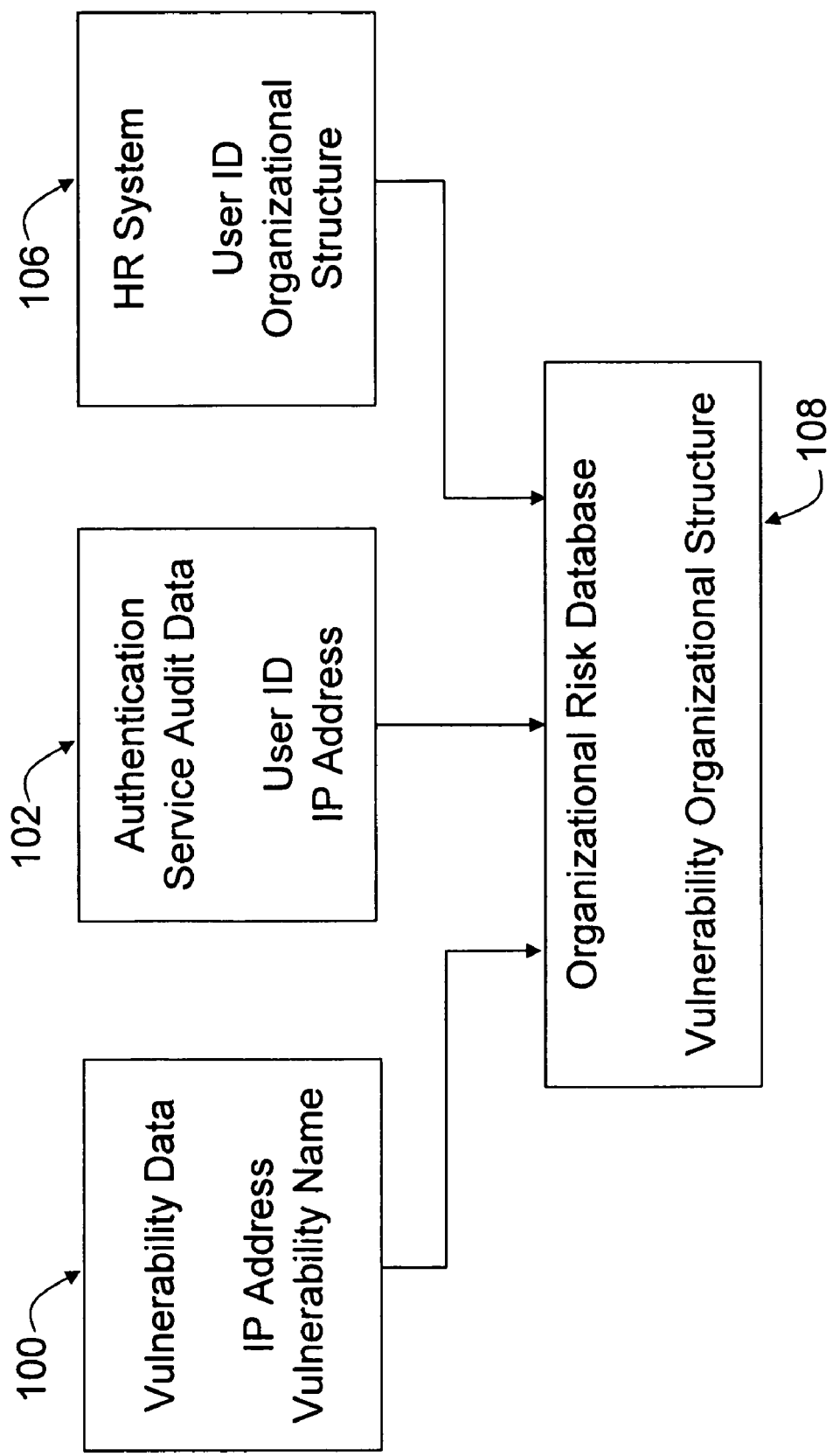
FIG. 1 illustrates three components of data schemas that may be used in one embodiment for determining a cyber risk in an organization according to the principles of the present invention.

FIG. 1 also illustrates an Authentication Service Audit database 102. This database pertains to a listing of authorized users for a given computer system, which again, can be identified via its network address. Typically, in an enterprise, users must identify themselves to the computing system via a user identifier. The user identifier (or user ID) is typically not kept secret, and is associated with a person. Oftentimes, the user identifier is a subset of letters associated with the person's name. For example, James Smith's user ID could be a certain number of letters of the last name and the first name's initial, such as 'smithj.' Because the user ID is not secret and can be easily derived, authenticating information is required. This information is frequently in the form of a password, which is kept secret and associated with the user ID. Security policies regarding the selection of a password are well known, such as incorporating a combination of a number of letter and symbols, and having a minimum number of characters. Many systems require changing the values frequently, and preclude certain common combinations.

Each system maintains a list of, or has access to, passwords for its authorized users. Various rules and policies maybe defined in an enterprise as to the scope of authorization given to various employees. Typically, a list can be generated of all recognized user IDs accessing various systems through an authentication audit log.

The above identified databases, the Vulnerability Database 100 and the Authentication Service Audit database 102 are typically within the scope of the information technology (IT) department of a large organization. The IT department obviously is familiar with the IT systems deployed in an enterprise, including those systems are accessed via a network (e.g. Internet). Ascertainment of cyber based risks is typically a function of information security department.

FIG. 1 also depicts a third database system—the Human Resources database 106. This database schema is defined usually by the human resources (HR) organization of a business enterprise. The HR database 106 stores the organizational data of the enterprise and reflects the relationship of associated individuals with respect to an organizational element. Thus, an enterprise can use such a system to identify all individuals within a given organization or organizational structure. Alternatively, the system can illustrate the organization structures, and their relationship, and identify those that are within a given organization(s). Typically, such systems can provide such information in the way of reports in a textual or graphical based format. Such reports include a person's name, their role (title) within an organization, and their relationship to others (e.g., subordinates or managers over others).

Individuals charged with dealing with cyber security and computer systems vulnerabilities require a comprehensive perspective of the global enterprise. Because such individuals charged with monitoring cyber security must often act in a reactive manner (e.g., in response to the latest computer virus), they require a fast and accurate perspective of the organization—both from a personnel perspective, but also from a computer system and risk perspective. Many computers in an enterprise can be networked, both at an organizational element level via local area networks and across an organization (inter-organizational element) via wide area networks, and computer security experts require a global view of the systems under the control of an organization. Thus, cyber-security individuals require an enterprise perspective of the organizations involved, and the HR systems 300 reporting the organization structure are a useful tool for providing this.

Cyber-security individuals may address security issues in any part of the organization, and may be called upon to estimate the required resources in terms of people or financial resources required to address security issues. Furthermore, cyber security individuals may be called upon to evaluate the status in various organizational elements and address those organizations that are deficient or which have a higher priority.

While cyber-security individuals may have a list of which computers are vulnerable, this by itself does not provide a global perspective of where the computers are deployed or where they are used in the organization. For example, an indication that a computer identified by a network address is vulnerable to a cyber attack does not indicate which organization is financially responsible for the computer, or the appropriate manager that should budget resources for correcting the vulnerability or is responsible for adhering to corporate security guidelines.

Figure 4:
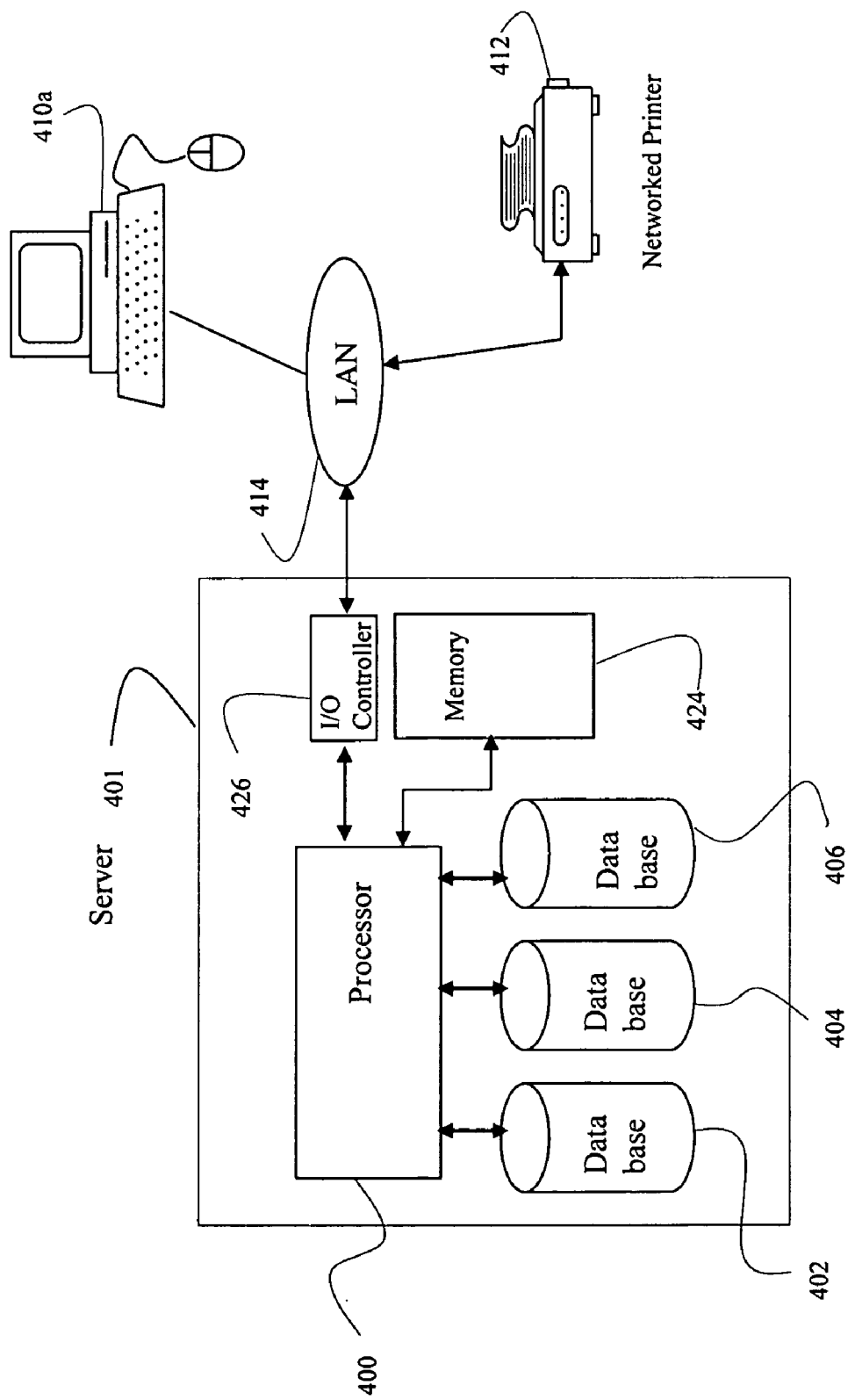
FIG. 4 illustrates one embodiment of a system for providing cyber-based risk reports.

Thus, in one embodiment according to the present invention, a computer system merges aspects of the vulnerability database 100, the authentication service audit database 102, and the HR system 106 to provide an integrated report shown in FIG. 1 as contained in an Organization Risk Database comprising a Vulnerability Organizational Structure 108. The computer system performing this function can be a conventional computer or server, whether it is a mainframe or personal computer. Such a computer is depicted in FIG. 4, and comprises a processor 400, accessing a plurality of databases, such as the vulnerability database 402, the authentication service audit database 404, and the HR database 406. The computer may have a display device, such as terminal or PC 410 for providing reports to cyber security personnel, as well as access to a printer 412 for printing such reports. The display device and/or printer may be accessed using a LAN 414 or other communication device. The server typically has memory 424 and an Input/Output controller 426. In other embodiments, the computer may obtain the information in the databases using a LAN or a network (e.g. Internet) for accessing other enterprise computing systems.

Figure 2:
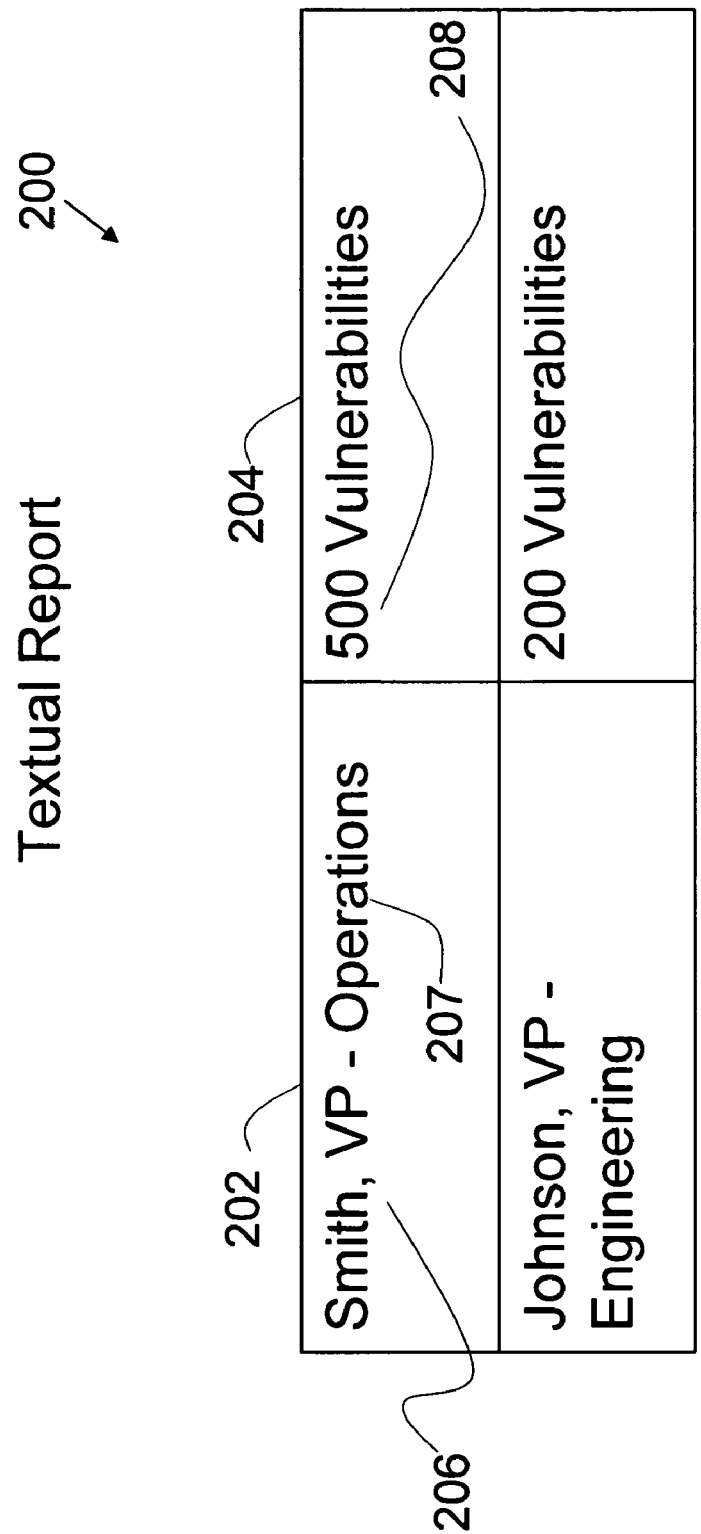
FIG. 2 illustrates a one embodiment of textual report indicating cyber risks in an organization according to the principles of the present invention.
Figure 3:
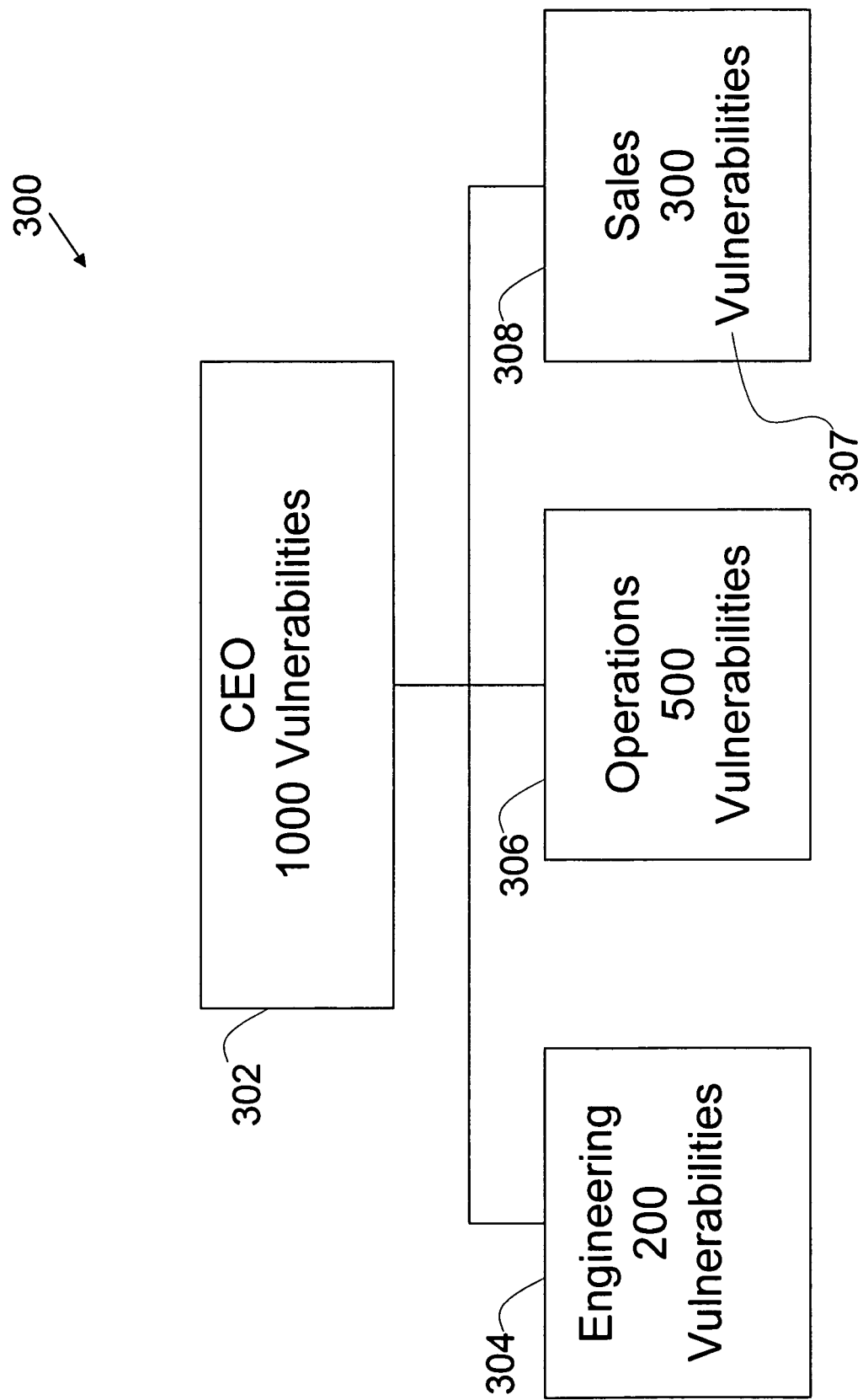
FIG. 3 illustrates another embodiment of a graphical report indicating cyber risks in an organization according to the principles of the present invention.

The integrated report can be provided in various forms, and a text based format 200 is illustrated in FIG. 2 and a graphical format is indicated in FIG. 3.

The linkage of the data is based on the network addresses of the vulnerable computers allowing identification of users via their user IDs, and linkage of the user ID data via to the organization data. This allows an indication of which computer systems are in which organizations, and of those systems, how many and which type of vulnerabilities are present.

Thus, the cyber-vulnerability report on an organization level provides a relative indication of the level of vulnerability of the systems managed, owned, and/or accessed by personnel within a specific organization. As shown in FIG. 2, the results can be provided in textual form. The manager of an organization is indicated in one column 202. All systems that can be accessed by individuals in that manager's organization or that are within the control of that manager are then used to compile a vulnerability indication 204. Since vulnerabilities can be individually quantified by name, type or description (e.g., an attribute), an aggregate number can be listed that is associated with all the systems used by individuals in that organization. For example, in one record of the report, Mr. Smith 206 is indicated with his organization designation 207, which is Vice President of Operations, along with the aggregate of the vulnerability attributes 208. The aggregate of vulnerability attributes typically encompasses all those computers indicated as within the control of his organization, or accessible by individuals in his organization.

Furthermore, the results can be graphically indicated as an organization chart 300 shown in FIG. 3. In FIG. 3, each organization entity is illustrated, include the CEO 302, the Engineering Organization 304, the Operations Organization 306, and the Sales Organization 308 is illustrated with a hierarchical relationship indicated between them. Furthermore, each entity is shown can be also indicated with the name of the responsible manager (not shown in FIG. 3) along with a relative number of vulnerabilities. For example, in the Sales Organization 308, there are 300 vulnerabilities reported 307.

The reports of FIGS. 2 and 3 can be augmented to also indicate various vulnerability attributes including but not limited to the number of computing systems, their network addresses and/or their location. The indication of the relative number of vulnerabilities is useful for a comparative indication of which organization is at the greatest risk, and which requires a relative greater (or lesser) number of resources, either in personnel or financial resources, to adequately address the vulnerability of that respective organization.

Furthermore, such a report can be augmented to allow tracking of intrusions so as to quickly identify the extent of which vulnerabilities result in actual intrusions. Because timely response is required when an intrusion or vulnerability is detected, the reports of FIGS. 2 and 3 allow easy identification of which organization is at risk.

The system for producing the vulnerability database may comprises any of the known computer systems typically used in an enterprise. One embodiment is shown in FIG. 4, which illustrates a server 401 that can be accessed by a user at a remote personal computer 410a using a LAN 414 or other communications network, such as the Internet. The server 401 typically comprises a processor 400 which can access three databases 402, 404, and 406 which comprise the vulnerability database, authentication service audit database, and the HR organizational databases respectively. The processor the merges the records into a memory 424, which can then be stored in yet another database (not shown). When the user desires, a request can be made to the processor 400 via the input/output controller 426 to provide a report in a desired form, such as a text report or graphical report by printing the report on a printer 412.

Figure 5:
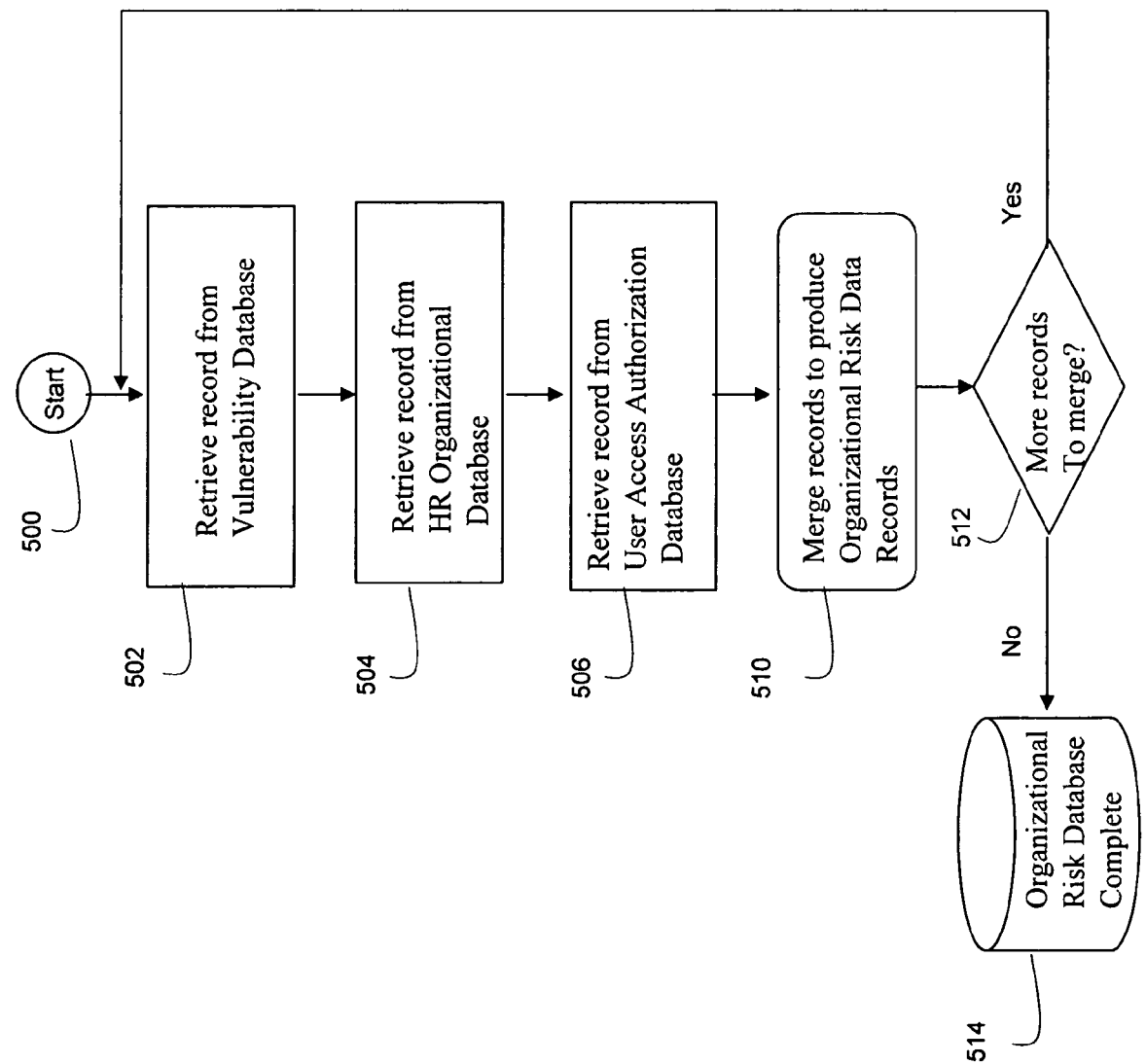
FIG. 5 illustrates one embodiment of the process for producing an organization risk database.

The steps for creating the organization risk database are disclosed in FIG. 5, which involve retrieving a record from the vulnerability database 502, as well as a record from the HR organizational database 504, and a record from the authentication service audit database 506, and merging the records together 510 as described previously. This is performed for all the records 512 in each of the databases. In most instances, there will not necessarily be the same number of records, and the algorithmic process can occur using various techniques known to those in computer science. When all the records have been processed, then the merged information can be written to a database 514 which constitutes the organizational risk database. At that point, a separate process (not shown) can process the records for producing the graphical or textual based reports for a user.

That which is claimed:

1. A method, comprising:
    accessing a first database comprising a plurality of first records wherein each first record comprises a computer identifier and a vulnerability data associated with the computer identifier wherein the vulnerability data provides a measure of cyber risk;
    accessing a second database comprising a plurality of second records wherein each second record comprises a user identifier and the computer identifier, wherein the user identifier is associated with a user authorized to access a computer associated with the computer identifier;
    accessing a third database comprising a plurality of third records wherein each third record comprises the user identifier and an associated organizational indication associated with a business enterprise, wherein the user identifier represents a name of a person associated with the organizational indication; and
    merging the first records, the second records and the third records to produce a fourth database comprising a plurality of fourth records wherein each fourth record comprises an organizational indication and an aggregate vulnerability indication based on associated vulnerability data, wherein the aggregate vulnerability indication comprises a total number of vulnerabilities associated with the organizational indication determined by:
    identifying matching third records having an associated organizational indication matching the organizational indication,
    extracting matching user identifiers from the matching third records,
    identifying matching second records having user identifiers matching the matching user identifiers,
    extracting matching computer identifiers from the matching second records;
    identifying matching first records having computer identifiers matching the matching computer identifiers,
    extracting matching vulnerability data from the matching first records, and
    summing the total number of vulnerabilities from the matching vulnerability data.

2. The method of claim 1 further comprising:
    producing a test-based report comprising a listing of a plurality of names, wherein each name is associated with at least one organization indication and the aggregate vulnerability indication.

3. The method of claim 1 further comprising:
    producing an organization chart comprising a plurality of names, wherein each name is depicted in relation to at least one other name, and each name is associated with at least one from the group comprising the organization indication and the aggregate vulnerability indication.

4. The method of claim 1 wherein the computer identifier is a network address of the computer.

5. The method of claim 1 wherein the user identifier is comprised of letters.

6. The method of claim 1 wherein the organizational indication is a numerical indication of an organization subset.

7. The method of claim 1 wherein the organization indication is an organizational title associated with the name.

8. The method of claim 1 wherein the vulnerability data further indicates a type of vulnerability.

9. The method of claim 2 wherein the report further includes an indication of a type of vulnerability.

10. The method of claim 1, wherein the fourth record further comprises hierarchical relationship information associated with the organizational indication reflecting a position within a hierarchical organizational structure of the business enterprise.

11. The method of claim 10, further comprising:
graphically displaying a hierarchical organizational chart, wherein the total number of vulnerabilities is display in the hierarchical organizational chart in association with the organizational indicator for each organization of the business enterprise.

12. The method of claim 11, wherein the hierarchical organizational chart further displays a name of a responsible manager for each organization of the business enterprise.

13. A system comprising:
a first database comprising a plurality of records of a first type each comprising a computer identifier and a vulnerability data associated with the computer identifier;
a second database comprising a plurality of records of a second type each comprising a user identifier and the computer identifier, wherein the user identifier is associated with a user authorized to access a computer associated with the computer identifier;
a third database comprising a plurality of records of a third type each comprising the user identifier and an associated organizational indication wherein the user identifier represents a name of a person within an organization associated with the organizational identifier;
a processor adapted to retrieve the plurality of records of the first, second and third types, merging the records to produce a record of a fourth type; and
a fourth database comprising a plurality of records of the fourth type, wherein each record of the fourth type comprises a first field indicating an organizational indication and a second field comprising an aggregate vulnerability indication, wherein the aggregate vulnerability indication comprises a total number of vulnerabilities associated with the organizational indication determined by the processor executing program instructions to:
identify matching records of the third type having an associated organizational indication matching the organizational indication.
extract matching user identifiers from the matching records of the third type,
identify matching records of the second type having user identifiers matching the matching user identifiers,
extract matching computer identifiers from the matching records of the second type;
identify matching records of the first type having computer identifiers matching the matching computer identifiers,
extract matching vulnerability data from the matching records of the first type, and
sum the total number vulnerability from the matching vulnerability data.

14. The system of claim 13 further comprising a printer for producing a report comprising a listing of names and vulnerability data.

15. The system of claim 13 wherein the records of the first type comprises a computer identifier in the form of a network address.

16. The system of claim 13 wherein the records of the second type comprise a user identifier comprising a subset of letters associated with the name.

17. The system of claim 13 wherein the processor retrieves the records from the first database by accessing a second processor over a communication network.

18. The system of claim 13 wherein the vulnerability data indicates the number and attributes of vulnerabilities associated with a computer.

19. A non-transitory computer readable medium comprising program instructions for causing a processor to:
retrieve a plurality of first records wherein each first record comprises a computer identifier and a vulnerability data associated with the computer identifier;
retrieve a plurality of second records wherein each second record comprises a user identifier and the computer identifier, wherein the user identifier is associated with a user authorized to access a computer associated with the computer identifier;
retrieve a plurality of third records wherein each third record comprises the user identifier and an associated organizational indication wherein the user identifier represents a name of a person within an organization associated with the organizational indication; and
produce a plurality of fourth records by merging the plurality of first records, the plurality of second records, and the plurality of third records wherein each fourth record comprises an organizational indication and an aggregate vulnerability indication based on associated vulnerability data, wherein the aggregate vulnerability indication comprises a total number of vulnerabilities associated with the organizational indication determined by the processor executing further program instructions to:
identify matching third records having an associated organizational indication matching the organizational indication,
extract matching user identifiers from the matching third records,
identify matching second records having user identifiers matching the matching user identifiers,
extract matching computer identifiers from the matching second records;
identify matching first records having computer identifiers matching the matching computer identifiers,
extract matching vulnerability data from the matching first records, and
sum total number of vulnerabilities from the matching vulnerability data.

\* \* \* \* \*